United States Patent [19]

McQuade

[11] 4,421,417
[45] Dec. 20, 1983

[54] FLUID DELIVERY MONITOR

[76] Inventor: Thomas F. McQuade, 11 Windham Loop, Staten Island, N.Y. 10314

[21] Appl. No.: 188,850

[22] Filed: Sep. 19, 1980

[51] Int. Cl.³ .......................... G04B 1/26; G04F 8/00
[52] U.S. Cl. ........................................ 368/65; 368/1; 368/10; 340/604; 377/21
[58] Field of Search ................. 368/65, 1, 9, 10, 107, 368/110–113; 137/552.9, 624.21; 220/70; 239/70; 235/92 FL, 92 PP, 92 T; 73/73; 324/61, 65; 340/604, 606, 610, 611

[56] References Cited

U.S. PATENT DOCUMENTS

| 681,083 | 12/1882 | Treadwell | 368/1 |
| 1,882,316 | 10/1932 | Cleary | 340/604 |
| 2,552,088 | 5/1951 | Davis | 340/604 |
| 2,638,579 | 5/1953 | Dyche, Jr. et al. | 340/611 |
| 2,660,057 | 11/1953 | Ackley | 368/1 |
| 2,882,914 | 4/1959 | Wiley et al. | 340/604 |
| 3,455,314 | 7/1969 | Glick et al. | 137/2 |
| 3,613,721 | 10/1971 | Horn | 137/551 |
| 3,845,883 | 11/1974 | Johnson et al. | 220/30 |
| 4,006,840 | 2/1977 | Shannon | 220/30 |
| 4,051,724 | 10/1977 | Segal et al. | 73/198 |
| 4,059,744 | 11/1977 | Elderton | 235/92 FL |
| 4,114,647 | 9/1978 | Sturman et al. | 137/624.2 |

Primary Examiner—Bernard Roskoski
Attorney, Agent, or Firm—Herman J. Hohauser

[57] ABSTRACT

A fluid delivery monitor having a flow sensor, accumulator for recording the duration of sensed flow, a code device to display the contents of and reset the accumulator upon entry of a preselected sequence, and a fluid sensor to disable the accumulator for sensed conductive fluid. The flow sensor is a pressure-sensitive switch recessed in a radial port and a vane substantially covering the port protects the switch from tampering and directs fluid toward the switch.

2 Claims, 4 Drawing Figures

FLUID DELIVERY MONITOR

BACKGROUND OF THE INVENTION

The present invention relates generally to monitoring of fluid flow and more specifically to an improved monitoring system for the delivery of petroleum products.

With petroleum becoming very expensive and even more so in the future, accurate measurement of the amount of petroleum products delivered to customers is increasingly important. Delivery trucks generally deliver gasoline to filling stations and fuel oil to residential or commercial accounts. The emphasis of prior art delivery devices is to provide a monitor at the truck in combination with the delivery ticket. A typical example is U.S. Pat. No. 3,366,967 to Sherman et al. This system provides an in-line flow monitor which actuates a time of day recorder at the beginning and end of fuel delivery as well as a lock for maintaining the ticket within the recording device for the printing of gallonage at the beginning and end of delivery. Although providing a certain degree of security for the oil companies and the customer, the delivery person had access to the delivery information and could alter it by other means. Thus there exists a need for a delivery monitor which is strictly under the control of the ultimate customer.

In order to provide a delivery monoitor which is economical enough and small enough to be owned and controlled by the ultimate customers, prior art flow rate meters are not applicable. They generally include rather bulky flow sensing devices and expensive circuitry. Similarly the accuracy of its measurement varies depending upon the configuration of the storage tank of the customer, temperature variations, pressure variations, as well as other factors. Similarly delivery of petroleum products offers a volatile environment which requires special safeguards.

Another ploy of bilking the customer is to flow water through the meter to run up the total. Thus there is a need for a flow delivery monitor which can determine when non-petroleum products are being delivered to the storage tank of the customer.

SUMMARY OF THE INVENTION

An object of the present invention is to provide a reliable economic fluid delivery monitor which can be owned and controlled by the individual customer.

Another object of the present invention is to provide a fluid delivery monitor which can be used to monitor the delivery of volatile fluids.

An even further object of the present invention is to provide an economical tamper-proof fluid delivery monitor.

Still even a further object is to provide a fluid delivery monitor which can detect the delivery of substantially conductive fluids into a storage tank for substantially non-conductive fluids.

A further object of the present invention is to operate in every harsh environment.

Still another object of the present invention is that it can be installed in any remote unimproved locations without requiring outside electrical or mechanical power.

Another object of the present invention is to provide a fluid delivery monitor which is intrinsically safe.

These and other objects of the invention are attained by a fluid delivery monitor having a flow sensor in a housing through which the fluid is delivered to sense fluid flow and actuate an accumulator which accumulates the elapsed time of the flow detected by the flow sensor. A coding device controls the display of the accumulator contents and resets the display upon entry by the customer of preselected first and second codes. A conductive fluid monitor is also provided to prevent accumulation of the sensed fluid flow for the duration of conducting fluid flowing through the monitor. The flow sensor is a high limit-low limit pressure-sensitive switch mounted in a recess in a radial port in the flow channel. The flow sensor activates the accumulator at the low limit and deactivates the accumulator at the high limit. A cover spaced from the radial port and substantially covering the port protects the pressure-sensitive switch from tampering as well as directing flowing fluid towards the pressure-sensitive switch. The flow sensor, recorder or accumulating device and the coding device are electronic devices and in combination with a battery are provided in a unitary housing which includes the flow channel. The fluid delivery monitor has a housing with a first coupler at one end adapted to be mounted to a storage tank and a coupler on the other end adapted to be coupled to the hose of the source or delivery truck. The measured or recorded accumulated time of flow can be converted by the customer using an appropriate chart into gallons delivered based on the specific design of his storage tank system.

Other objects, advantages and novel features of the present invention will become apparent from the following detailed description of the present invention when considered in conjunction with the accompanying drawings.

DESCRIPTION OF THE PREFERRED EMBODIMENTS

Figure 1:
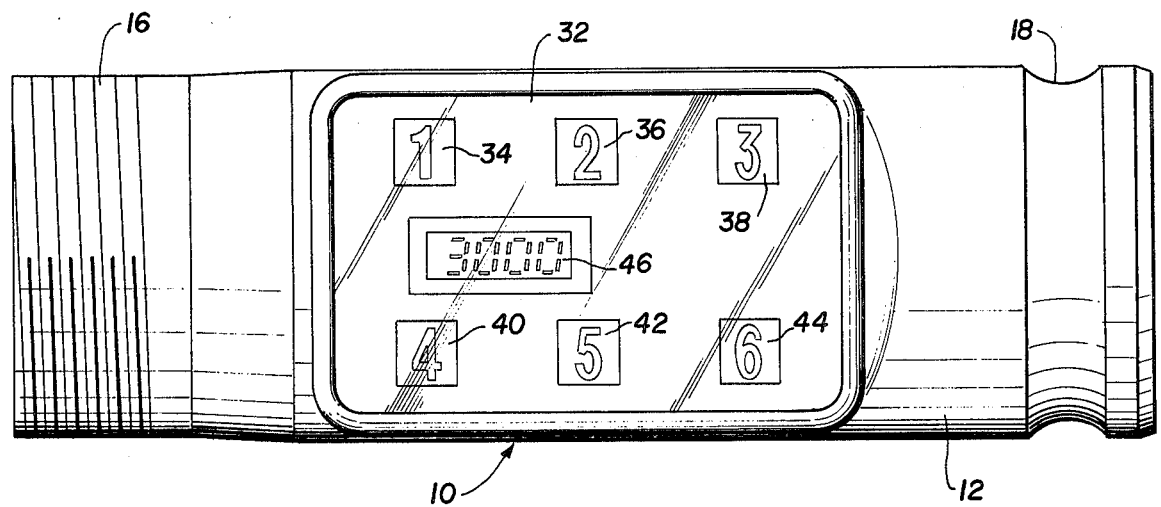
FIG. 1 is a plan view of a fluid delivery monitor incorporating the principles of the present invention.
Figure 3:
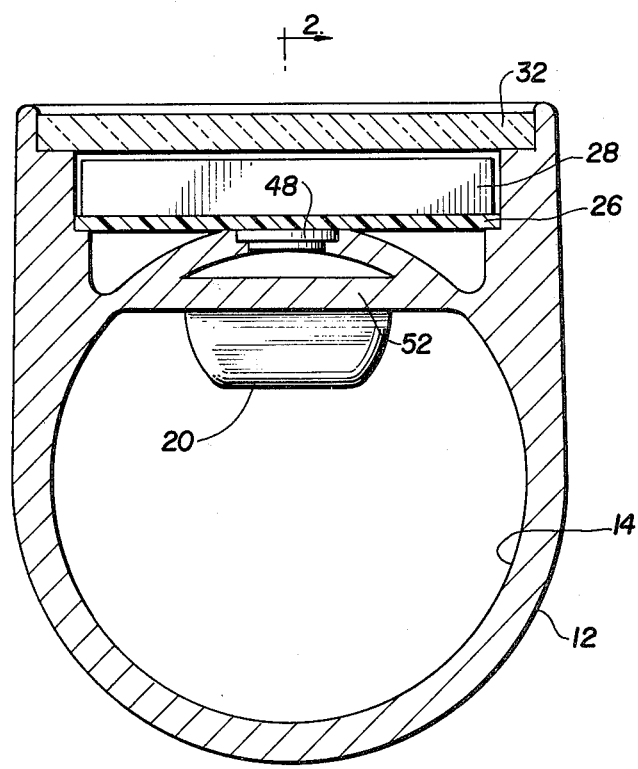
FIG. 3 is a cross-sectional view of a fluid delivery monitor of FIG. 1 taken along lines 3—3 of FIG. 2.
Figure 2:
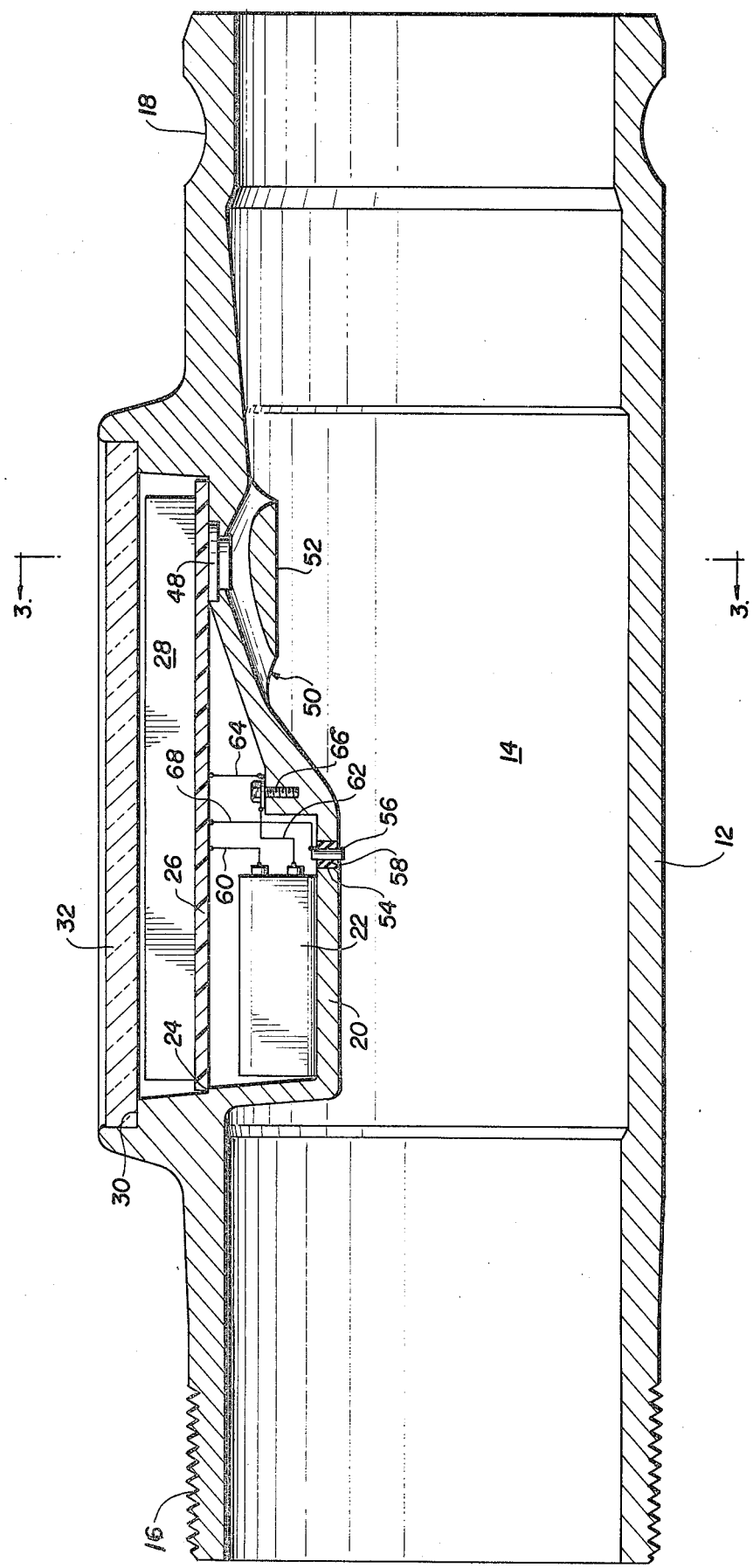
FIG. 2 is a cross-sectional view of the fluid delivery monitor of FIG. 1 taken along lines 2—2 of FIG. 3.

FIGS. 1-3 illustrate a fluid delivery monitor 10 incorporating the principles of the present invention and includes a tubular housing 12 having a flow channel 14 interior thereto. The outlet end 16 of housing 12 is threaded for coupling to a fill pipe whereas the inlet end 18 includes an annular recess for coupling to a delivery device. Although the housing 12 is designed specifically for delivery of petroleum products, the ends 16 and 18 may be designed to be coupled to any fluid system as an in-line monitor. A well 20 extends into the interior of the flow channel 14 and houses the electronic devices and power supply of the fluid delivery monitor. As diagrammatically illustrated in FIG. 2, a battery 22 lies in the bottom of well 20. Resting in shoulder 24 of the well 20 is a printed circuit board 26 to which is mounted the circuitry of the fluid delivery monitor which is illustrated as a block 28. Resting in a further shoulder 30 in the well 20 is a clear cover plate 32 secured thereto by fasteners.

As illustrated in FIG. 1, the cover plate 32 includes six areas 34, 36, 38, 40, 42 and 44 having distinctive numbers 1, 2, 3, 4, 5 and 6 therein and a display 46. The areas 34, 36, 38, 40, 42 and 44 represent switches to enter codes into the electronics of the monitor as will be explained below. In the preferred embodiment, magnetic read switches are below the appropriate area and a magnetic actuator is used to momentarily actuate the appropriate switch. Alternatively, openings may be provided in the cover 32 and pushbutton switches may be located at areas 34, 36, 38, 40, 42 and 44. The visuals display 46 may be a liquid crystal or a light-emitting diode display or may be any other form of display. It is preferred that the cover 32 be a relatively thick piece of plastic with no openings to increase the security of the fluid delivery monitor.

A flow sensor 48 is located in the surface of the flow channel 14 and is recessed in a radial port 50 relative to the flow channel 14. A member or vane 52 substantially covers the radial port 50 while allowing axially flow of the fluid in the flow channel 14 from the inlet 18 towards end 16 to upon the flow sensor 48. As illustrated in FIG. 2, the cross section of the vane 52 is substantially that of an air foil. This allows vane 52 to direct and amplify fluid flow towards the fluid sensor 48 as well as providing a protection for the flow sensor 48 to prevent tampering. In a preferred embodiment, fluid sensor 48 is a pressure-sensitive switch which is responsive to fluid flow. A small, highly sensitive membrane switch may be used, for example, those available from Duralith Corporation of Millville, N.J. and known as Press-Flex. These switches are responsive to 2-3 ounces of pressure. Since the flow sensor 48 is a pressure-sensitive switch, it can be easily defeated by creating a static fluid pressure in the flow channel. Thus the pressure-sensitive switch should have a high pressure limit. This can be used to deactivate the switch or close another circuit as a control. Alternatively, a second high pressure switch can be used for this purpose.

In an opening 54 in the well 20 is a probe 56. An insulator 58 electrically insulates the probe 56 from the well 20 and the remainder of the housing 12. The probes 56 in combination with the housing 12 forms a pair of probes which detect conductive fluid in the flow channel 14.

As schematically illustrated in FIG. 2, the positive terminal of battery 22 is connected by leads 60 to the printed circuit board 26. Leads 62 and 64 connect the negative terminal of battery 22 and the circuit board 26 to the housing 12 by fastener or terminal 66. A lead 68 connects the probe 56 to the printed circuit board 26 and the circuitry thereon. The terminal 66 and housing 11 form a ground for the printed circuit board 26 and circuitry 28 thereon. Thus it is obvious that the housing becomes the second lead for a pair of probes for the conductive fluid sensor.

Figure 4:
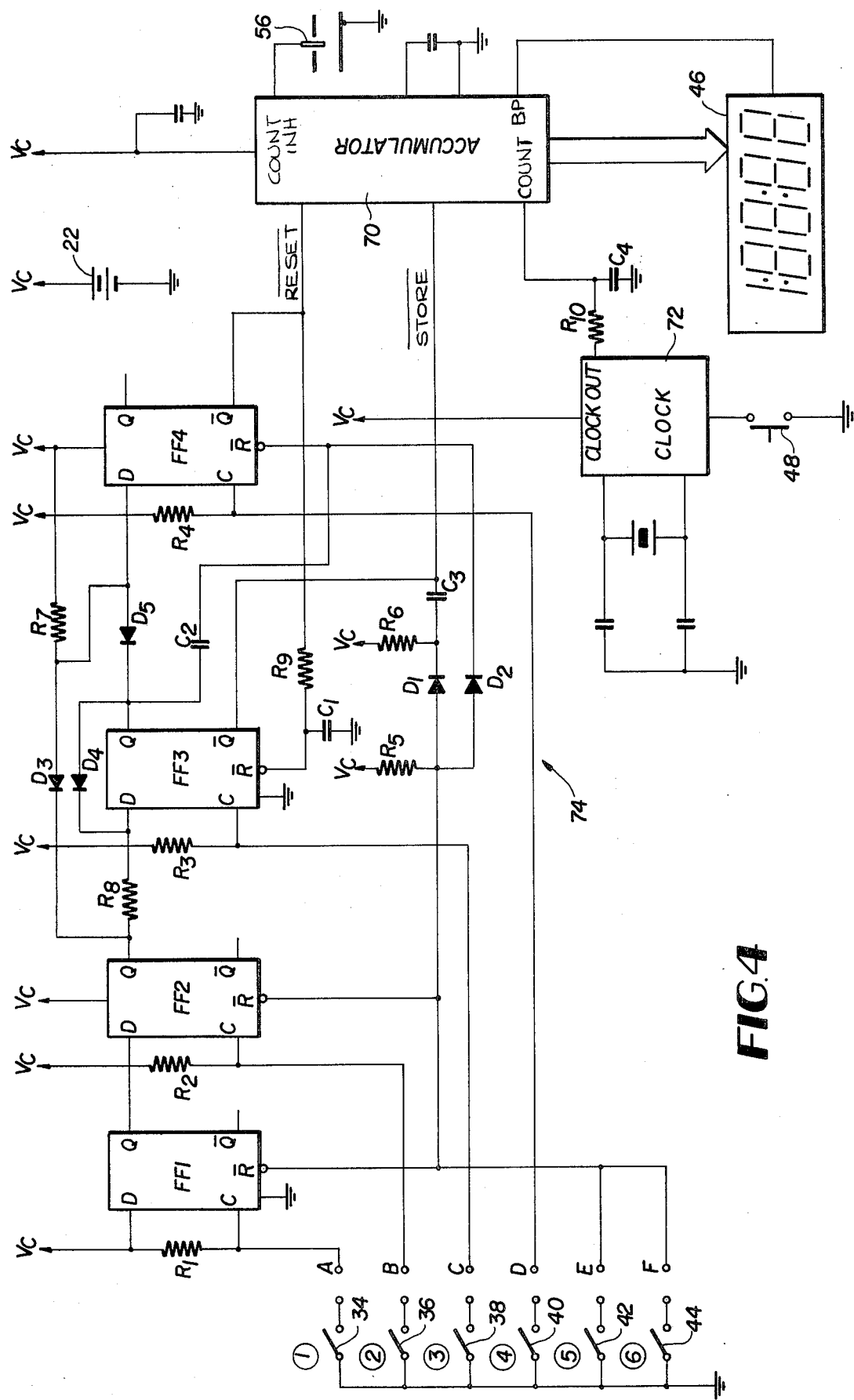
FIG. 4 is a schematic of a fluid delivery monitor incorporating the principles of the present invention.

The circuitry 28 of the present invention is illustrated in the schematic of FIG. 4 and includes an accumulator 70, a clock 72, and a logic decoding section 74. The membrane switch 48 is connected between ground and the ground input to clock module 72. The output of the clock module 72 is connected to the COUNT input of the accumulator 70. The display 46 is connected to the display driver output of the accumulator 70 as well as the BACK PLANE output BP of the accumulator 70. The count inhibit terminal $\overline{\text{COUNT INH}}$ of accumulator 70 is connected to probe 56 of the liquid sensor. The accumulator 70 is a recorder of the elapsed time of the closure of switch 48. The $\overline{\text{RESET}}$ and $\overline{\text{STORE}}$ terminal of accumulator 70 are controlled by the decoding logic 74. The accumulator 70 may be a counter-latch-display driver available from Intersil having Part No. 7224A. Similarly the clock 72 may be Part No. 7213 also available from Intersil. The high pressure switch may be a normally closed switch in series with low pressure switch 48 or a normally open switch connected to the count inhibit terminal.

Input to the decoding logic 74 is from the switches 34, 36, 38, 40, 42 and 44 having one side connected to ground and the other side connected to an appropriate terminal A, B, C, D, E, F by jumpers not shown. The decoding logic in response to a first code sequence at terminals A, B, C, D, E, F provides a $\overline{\text{STORE}}$ control signal to the accumulator 70 to enable the display 46 which displays the contents of the accumulator. In response to a second code sequence at terminals A, B, C, D, E, F the decoder logic 74 provides a reset signal to the accumulator 70 to reset the accumulator and remove the $\overline{\text{STORE}}$ signal from the accumulator to deactivate the display 46. While the decoder logic 74 is hard-wired to decode the first and second coded sequences, the jumpers between the switches 34, 36, 38, 40, 42, and 44 and the terminals A, B, C, D, E, F may be varied to change the relationship between the sequence inputed at the switches 34, 36, 38, 40, 42, 44 and the sequence received by terminals A, B, C, D, E, F. Thus relative to the outside world or user, the sequence can be customized even though the decoder logic is set for two predetermined coded sequences.

As will be evident from the detailed description below, the decoder logic 74 in response to the first sequence activates the store to enable the display 46 to display the contents of the accumulator 70. In response to a second sequence which must be preceded by the first coded sequence, decoding logic resets the accumulator and deactivates the display.

The decoding logic 74 includes a plurality of flip-flops FF1, FF2, FF3 and FF4. Terminals A, B, C, and D are connected to the clock inputs of flip-flops FF1, FF2, FF3 and FF4, respectively. A resistor R1 normally holds the clock input of flip-flop FF1 high. The data input D of FF1 is connected to the voltage supply $V_C$ is always high. Resistors R2, R3 and R4 connect the clock input of flip-flops FF2, FF3, FF4, respectively, to the voltage supply $V_C$ normally holding them high. Thus momentarily closing the switch of respective terminal will cause the respective clock input of the flip-flop to have a high-to-low-to-high transition. On the low to high transition, the output Q of the clocked flip-flop will assume the logic state of the input D.

The Q output of flip-flop FF1 is connected to the data input D of flip-flop FF2. The Q output of flip-flop FF2 is connected to the data input D of flip-flop FF3 through an isolation resistor R8. The Q output of flip-flop FF3 is connected to the data input D of flip-flop FF4 through diode D5. The $\overline{\text{Q}}$ output of flip-flop FF3 is connected to the $\overline{\text{STORE}}$ input of the accumulator 70 and the $\overline{\text{Q}}$ output of the flip-flop FF4 is connected to the $\overline{\text{RESET}}$ input of accumulator 70.

The $\overline{\text{Q}}$ outut of flip-flop FF3 is also connected through capacitor C3 and diode D1 to the reset inputs of flip-flops FF1 and FF2. It should also be noted that terminals E and F are also connected to the reset inputs, labelled $\overline{\text{R}}$, of flip-flops FF1 and FF2. Pull-up resistor R5 holds the reset inputs of FF1 and FF2 high. R6 holds the junction of diode D1 and C3 at $V_C$ and provides a path for current to recharge C3 after it has been discharged. The Q output of flip-flop FF3 is connected to the data input D of flip-flop FF3 through diode D4 to act as a set latch. The Q output of flip-flop FF3 is also connected through capacitor C2 to the reset input of flip-flop FF4 and the resets of flip-flops FF1 and FF2 through diode D2. The Q output of FF4 is also connected through resistor R9 and capacitor C1 to the reset terminal of flip-flop FF3. Resistor R7 interconnects the data input to FF4 to the voltage terminal $V_C$ and normally holds it high. The Q output of flip-flop FF2 is connected to the data input D of FF4 through diode D3.

The operation of the decoder logic will now be explained. The first sequence needed to actuate the display is A, B, C. The second sequence to reset the accumulator and deactivate display is A, B, D. Initially all the outputs Q of the flip-flops are low. When terminal A is grounded by an appropriate switch, and then released, the clock input C for FF1 becomes low on closing the switch and becomes high on release of the switch. With ths high to low transition, the Q output of FF1 assumes the value of the data input which is high since it is tied continuously to the voltage supply $V_C$. When switch B is closed and then released, the clock input of FF2 goes through the high-low-high transition and then high output of Q1, which is the data input to FF2, causes the Q output of FF2 to become high. When terminal C is cycled by an appropriate switch to go low and then high on the clock input of FF3, the output Q of FF3 becomes high. The high on the Q output of FF3 latches the data input D of FF3 to high through diode D4. Thus any subsequent closure of switch C with the output Q of FF2 being low will not cause the Q output of FF3 to become low. The only way FF3 can be reset is through its reset input $\overline{R}$.

As the Q output of FF3 goes high, the $\overline{Q}$ output goes low. This high to low transition is coupled across capacitor C3 and diode D1 to the reset inputs of flip-flop FF1 and FF2. This resets these first two flip-flops. It is after this reset pulse has been coupled that resistor R6 is used to recharge capacitor C3.

The $\overline{Q}$ output of FF3 is also connected to the $\overline{\text{STORE}}$ input of accumulator 70. This input controls the interconnection of the accumulator 70 and the display 46. When $\overline{\text{STORE}}$ is high, the accumulator is disconnected from the display 46. When the $\overline{\text{STORE}}$ is low, the accumulator is allowed to drive the display 46. In the specific Part No. 7224A the accumulatlor includes a counter and a display latch. The $\overline{\text{STORE}}$ signal controls the display latch to receive the contents of the counter and drive the display with the value of the latch. Thus once FF3 is set, the $\overline{Q}$ output is low and the count of the accumulator is displayed. Thus with the entry of the sequence A, B, C, the contents of the accumulator is continuously transmitted to display 46.

Accumulator 70 will be reset when $\overline{Q}$ of FF4 is low and thus Q of FF4 is high. For a high-low-high transition on the clock input of FF4 by the momentary closing of terminal D, the data input D of FF4 must be high to produce a low $\overline{Q}$ to reset the accumulator. The data input D to FF4 is pulled up to $V_C$ by R7 except when grounded by conducting diodes D3 and D5. When the Q outut of FF3 is low, the diode D5 is conducting and the input D to FF4 is low. Thus the Q output of FF3 must be high in order to maintain a high ouput on FF4. Similarly diode D3 also connected to the data input of FF4 is connected to the output of FF2. If the Q output of FF2 is low, D3 is conducting and the data input of FF4 is again low. Thus in order for the data of FF4 to be high in order to set the $\overline{Q}$ low and reset the accumulator 70, the Q outputs of FF2 and FF3 must be high.

For this condition, the second sequence includes an A followed by a B to set flip-flops FF1 and then FF2 Q outputs high which will reverse bias diode D3 and must be preceded by the A, B, C sequence to provide a high on the Q output of FF3 to reverse bias diode D5 thereby allowing a high input through R7 to the data input D of FF4. In the second sequence of A, B and followed by the D, the clock has a high-low-high transition which causes the $\overline{Q}$ output to go low and reset the accumulator. The counter of the accumulator is immediately reset. At a finite time later, determined by the time constant of resistor R9 and capacitor C1, the flip-flop FF3 is reset causing the Q output of FF3 to become low. This high to low transition of the Q output of FF3 resets flip-flop FF4 through capacitor C2 and the reset input $\overline{R}$ of FF4 and resets flip-flops FF1 and FF2 through diode D2. It should also be noted that the resetting of FF3 causes the $\overline{Q}$ output of FF3 to become high which disables the $\overline{\text{STORE}}$ input to accumulator 70 and disables display 46.

The decoding logic 74 is an example of one simple circuit which may be used to provide the decoding and control function of accumulator 70 and display 46 required by the present fluid delivery and monitor. Obviously other types of decoder logic may be used to control the $\overline{\text{RESET}}$ and $\overline{\text{STORE}}$ terminals of the accumulator 70.

The use of the flow delivery monitor 10 begins with the accumulator 70 reset to zero and the display 46 off. The delivery person then connects outlet 16 of the flow monitor as a nipple or coupler onto the storage tank of the customer and connects his hose to inlet 18. As mentioned previously, the fluid delivery monitor 10 may be permanently installed on the inlet to the delivery tank. The delivery person then begins delivering fluid through flow channel 14 to the storage tank. The flow sensor 48 closes activating the clock 72 to drive the accumulator 70. Once he is done delivering the desired amount of fluid, he disconnects his hose from inlet 18 and goes on his way.

The owner of the storage tank then activates the readout by a code sequence A, B, C and an indication of the total elapsed time of flow through the meter is displayed. He then uses a chart to convert the elapsed time of flow to gallons delivered for his specific installation. The owner then may reset the accumulator and disable the display by using the code sequence A, B, D. As indicated previously, the owner does this by activating appropriate switches 34, 36, 38, 40, 42 and 44 in a sequence customized for his use. If the delivery person attempts to transmit conductive fluid, for example water, through the flow channel, sensor 56 will detect such conductive fluid because said fluid will effectively pull the counter inhibit input of accumulator 70 low. This prevents clock pulses from the clock, which is on since the fluid is flowing as sensed by flow sensor 48, from being accumulated. Thus the accumulator will not accumulate time for conductive fluids. This is especially useful where petroleum products are being delivered.

From the preceding description of the preferred embodiments it is evident that the objects of the invention are attained in that a fluid flow monitor having increased security is provided. Although the invention has been described and illustrated in detail, it is to be clearly understood that the same is by way of illustration only and is not to be taken by way of limitation.

The spirit and scope of the present invention are to be limited only by the terms of the appended claims.

What is claimed:

1. A fluid delivery monitor comprising:
   a housing including a flow channel;
   flow sensor means in said housing for providing a flow signal in response to fluid flow in said flow channel;
   accumulative means having a count input, reset terminal and store terminal responsive to said flow signal from said flow sensor means for accumulating the elapsed time of said flow signal;
   clock means having an output connected to said count input of said accumulative means; and
   code means for controlling said accumulative means in response to receipt of a preselected code, wherein said accumulator means includes a display and a logic decoding section and said code means enables said accumulator means in response to a receipt of a first preselected code to display said accumulated elapsed time and said logic decoding section of said accumulator means controls said reset terminal and said store terminal, and wherein said code means resets said accumulator means in response to receipt of a second preselected code.

2. A fluid delivery monitor comprising:
   a housing including a flow channel;
   a radial port in said flow channel;
   a flow sensor means mounted in said radial port recessed from said flow channel for providing a flow signal in response to fluid flow in said flow channel;
   a vane means spaced from and substantially covering said radial port for directing fluid flowing in said flow channel toward said flow sensor means and protecting said flow sensor means from tampering;
   an accumulator means having a count input, rest terminal and store terminal responsive to said flow signal from said flow sensor means for accumulating the elapsed time of said flow signal; and
   clock means having an output connected to said count input of said accumulator means;
   wherein said vane means includes a member having an air foil cross-section substantially parallel to the axis of said flow channel.

* * * * *